T. ORLANDO.
SHIP FENDER.
APPLICATION FILED JAN. 31, 1914.
1,100,607.
Patented June 16, 1914.
3 SHEETS—SHEET 1.
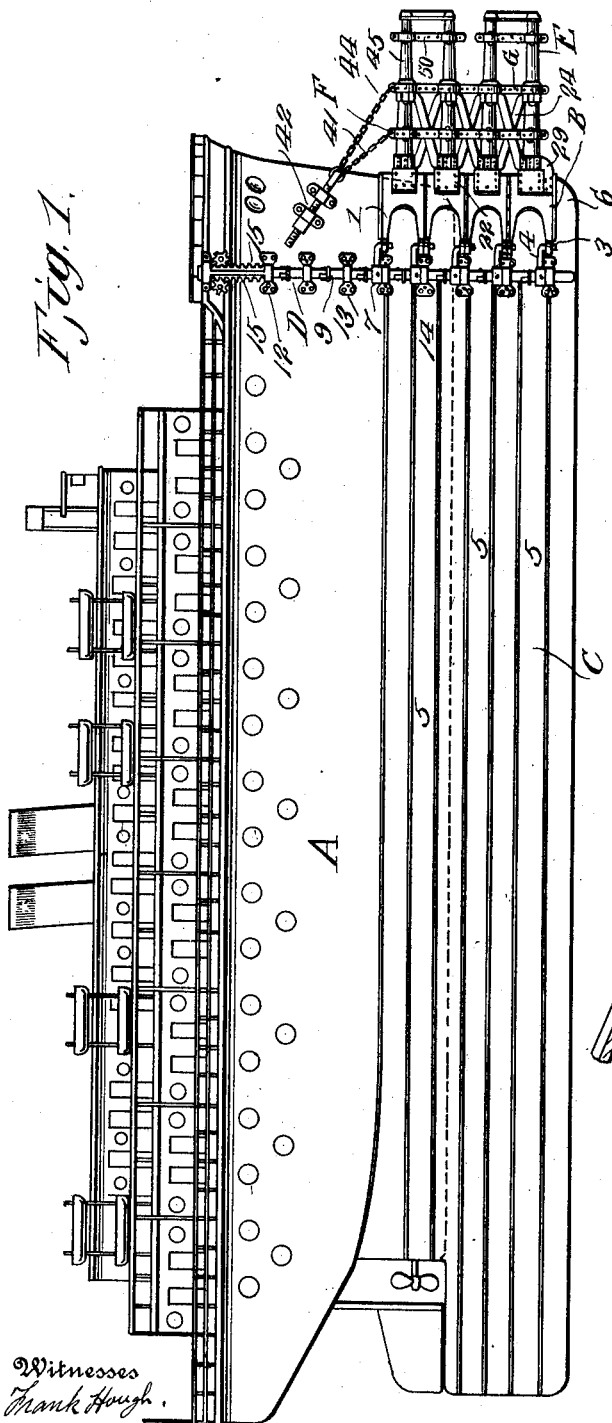
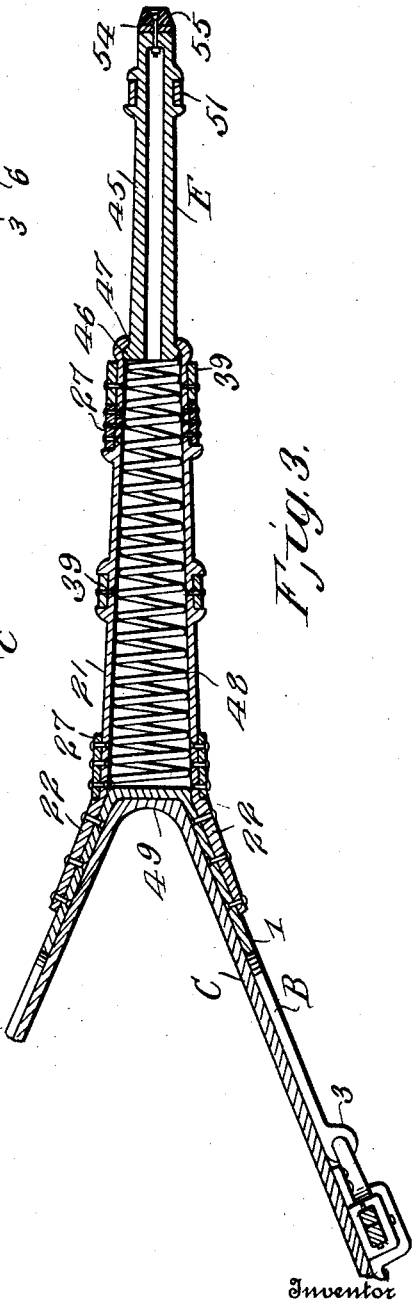
Inventor
Tony Orlando,
By Victor J. Evans
Attorney
Witnesses
Frank Hough.
R. M. Smith.

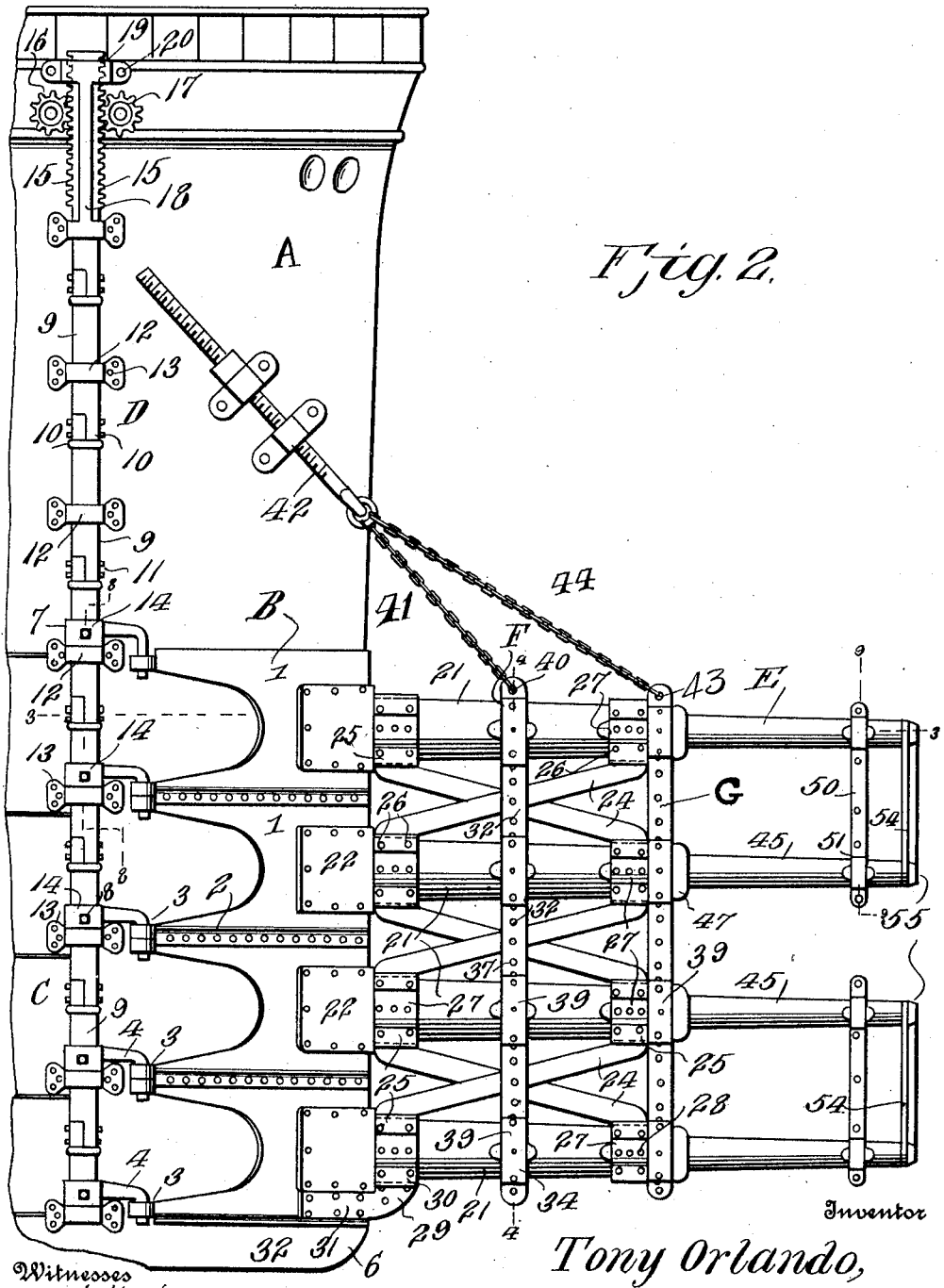

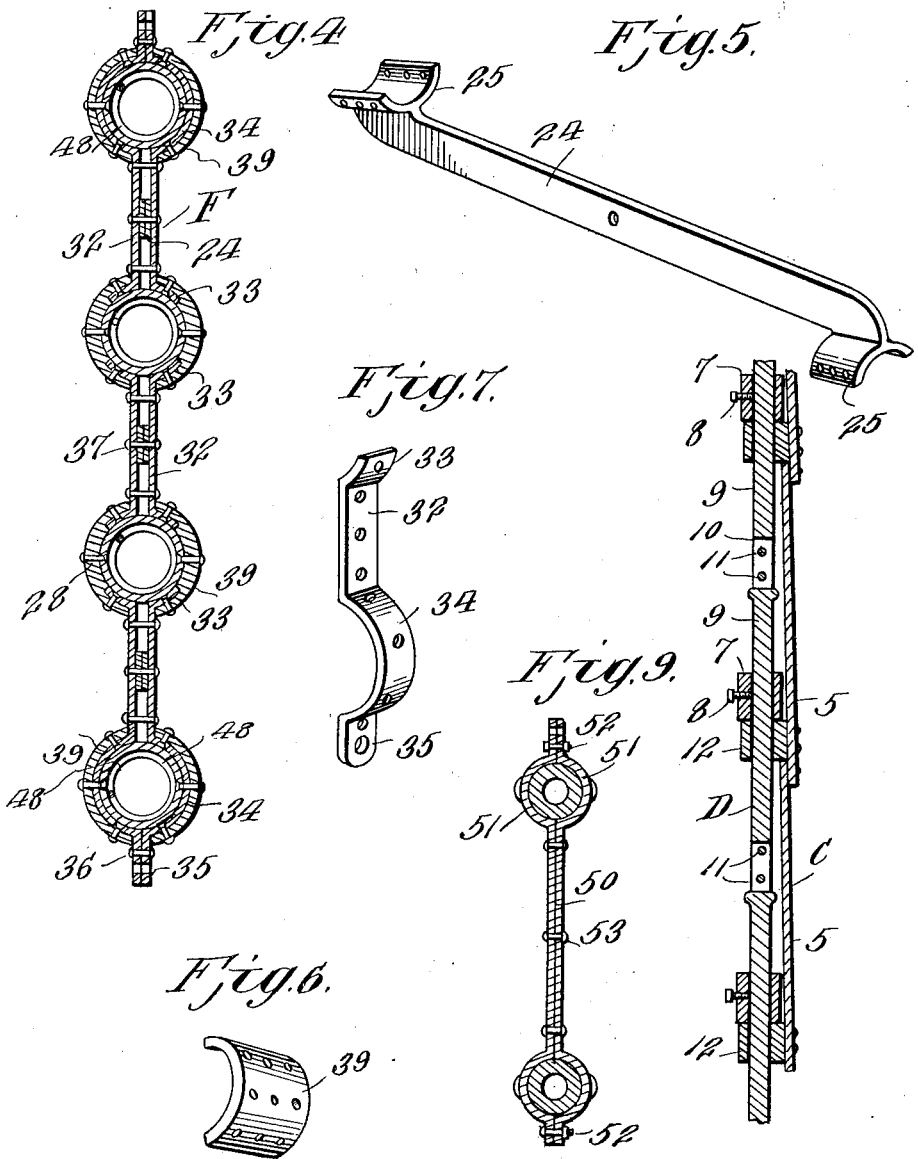

UNITED STATES PATENT OFFICE.

TONY ORLANDO, OF BROOKLYN, NEW YORK.

SHIP-FENDER.

1,100,607. Specification of Letters Patent. Patented June 16, 1914.

Application filed January 31, 1914. Serial No. 815,814.

*To all whom it may concern:*

Be it known that I, TONY ORLANDO, a citizen of the United States, residing at Brooklyn, in the county of Kings and State of New York, have invented new and useful Improvements in Ship-Fenders, of which the following is a specification.

This invention relates to fenders for marine vessels, the object of the invention being to provide a fender of such form and construction that it will project both in advance of the bow of the vessel and downwardly below the deepest point of draft of the vessel so as to prevent contact between the hull of the vessel and foreign objects particularly icebergs, rocks and other submerged obstructions.

A further object of the invention is to provide a fender of such construction that it may be readily placed in position and removed when not needed in use, the structure of the fender being such that parts thereof may be separated from each other thereby greatly facilitating the mounting of the fender on a vessel and the removal of such fender therefrom.

With the above and other objects in view, the invention consists in the novel construction, combination and arrangement of parts, as will hereinafter be more fully described, illustrated and claimed.

In the accompanying drawings:—Figure 1 is a side elevation showing the fender of this invention applied to a marine vessel.
Fig. 2 is a detail side elevation on an enlarged scale showing the front part of the structure of the fender. Fig. 3 is a longitudinal section on the line 3—3 of Fig. 2. Fig. 4 is a vertical cross section on the line 4—4 of Fig. 2. Fig. 5 is a detail perspective view of one of the diagonal braces. Fig. 6 is a detail view of one of the plunger tube holding collars. Fig. 7 is a detail view of one of the bottom clips. Fig. 8 is a detail vertical section on the line 8—8 of Fig. 2. Fig. 9 is a detail vertical section on the line 9—9 of Fig. 2.

Referring now to the drawings A designates generally a marine vessel to which the fender of this invention is shown applied.

The fender comprises a head yoke B consisting of a number of sections 1 substantially U-shaped in horizontal section so as to conform approximately to the bow of the vessel, the sections 1 being riveted together as shown at 2 so that the entire vertical series of sections 1 form a rigid head yoke.

The head yoke formed as hereinabove described is provided along its rear edges with a vertical series of knuckles 3 all arranged in vertical alinement to receive a corresponding series of L-shaped pins or hooks 4 which are insertible through the knuckles 3 and removable therefrom for the purpose of separating the forward and rearward sections of the complete fender.

Extending rearwardly from the yoke B on adjacent sides of the vessel are side fender elements C each composed of horizontally extending plates 5 overlapped and riveted or otherwise fastened together to form an imperforate side fender plate extending from the hull downwardly any suitable depth, the parts B and C of the fender being approximately of the same depth and the forward lower corners of the side fender plates being rounded upwardly as shown at 6 so as to deflect any submerged floating material.

D designates a pair of vertical coupling rods by means of which the sections B and C of the fender are connected together, each of said rods D carrying a vertical series of the hooks 4 above referred to and each of said hooks comprising a collar 7 which fits around the rod D and is pinned thereto as shown at 8.

Each rod D comprises a number of similar sections designated at 9, the said sections having lugs 10 projecting from the opposite ends thereof through which bolts 11 are inserted. This enables a rod of any suitable length to be formed in accordance with the depth to which the fender as a whole extends below the bottom of the vessel. Each rod D is attached to one of the side fender plates by means of U-shaped clips 12 riveted as shown at 13 to the side fender plates and also to the side of the vessel as shown in Fig. 2. Collars 14 on the rod D limit the upward and downward movement thereof.

The means for moving each rod D longitudinally is illustrated in Fig. 2 wherein it will be observed that the upper section of the rod D is formed on opposite sides thereof with rack faces 15 into which mesh oppositely located pinions 16 the shafts 17 of which extend through the side of the vessel so that they may be operated by suitable motive power contained in the vessel for moving the rod D upwardly and downwardly for the purpose above stated. The upper section of each rod D is held and guided by one or more guide plates or strips 18 each having a T-shaped base or attaching portion 19 at its upper end riveted or otherwise fastened to the side of the vessel as at 20. By moving each rod D upwardly, the portion 5 of the fender may be disconnected from the head yoke B thus separating the two main elements of the fender and by moving the rod D in a downward direction, said parts may again be coupled together.

The means for cushioning the impact against a foreign object is designated generally by the reference character E best shown in Fig. 2, said part of the fender comprising a vertical series of plunger guide tubes each designated at 21. Each of said plunger guide tubes 21 is provided at its rear end with oppositely extending attaching portions or flanges 22 which are riveted to the opposite side portions of the head yoke as shown at 23. The tubes 21 are interconnected and braced relatively to each other by means of diagonal cross braces 24 as shown in Fig. 2, one of said braces being illustrated detached in Fig. 5 wherein it will be observed that at each end, each brace 24 is provided with oppositely arranged flanges or cheek plates 25 riveted at 26 to sleeves or collar plates 27 which extend around the front and rear ends of the tubes 21 and are riveted thereto as at 28. The bottom tube is additionally secured to the yoke by means of a bottom clip 29 having flanges 30 for connection with the rear end of the adjacent plunger guide tube and other rearwardly extending flanges 31 riveted at 32 to the front lower corner of the yoke B.

All of the tubes 21 are interconnected and tied together by means of a vertically extending sectional tie F which is composed of a plurality of sections 32 having quadrant shaped end portions 33 extending one-quarter the way around the central portion of each tube, the lower section being provided with a semi-circular portion 34 extending half way around the bottom tube and terminating in a bottom flange 35 whereby like sections at opposite sides of the vertical series of tubes may be fastened together by means of bolts or rivets 36. The sections being fastened together at points intermediate the plunger guide tubes by rivets 37 or their equivalent. Lap joint plates or strips 39 connect the portions 33 of the sections of the tie bar and in this way all of the tubes are tied together in rigid relation to each other. At its upper end the tie bar is provided with an eye 40 to receive one or more bob-stays 41 extending upwardly and rearwardly and being fastened to the hull of the vessel as indicated at 42.

A similar tie bar G connects the forward extremities of all of the plunger guide tubes as shown in Fig. 2, the construction of the bar G being the same as that of the bar F, and the bar G being provided at its upper end with an eye 43 to receive one or more additional bob-stays 44 leading upwardly and rearwardly to and connected with the vessel. The bob-stays 41 and 44 are shown in the form of chains.

Slidingly mounted in each of the plunger guide tubes 21 is a plunger 45 provided adjacent to its rear end with an enlarged flange 46 which engages a corresponding flange 47 at the forward end of the respective guide tube in order to prevent the plunger from escaping entirely from said tube when at the forward limit of its movement. Within said guide tube 21 is a coiled expansion spring 48 which bears at its forward end against the rear end of the flange 45, the rear end of said spring bearing against a plate 49 which closes the rear end of the guide tube 21.

Adjacent to their forward ends, the plungers 45 are connected in pairs by tie bars 50 consisting of oppositely arranged straps having their end portions bent to form semi-circular bands 51 which embrace the plungers 45 and are bolted together at 52 and 53. Connecting the extremities of such pair of flanges is a head plate 54 and fastened to said head plate is an impact cushion 55 of rubber or like material which will cushion the impact when the plungers strike an obstruction. The head plates 54 and the tie bars 50 brace the plungers relatively to each other in pairs and this adds to the strength and efficiency of the fender.

The fender hereinabove described may be made of any suitable size in accordance with the dimensions of the vessel in connection with which it is used and being of sectional construction it may be made of any desired depth. The head yoke B forms the support for the cushioning means designated generally at E and the head yoke B and side fender plates C are detachably connected by means of the vertically slidable coupling rods D, the latter being operable by mechanism on or within the vessel. This enables the parts of the fender to be separated and connected without the necessity of employing an expert diver. The plunger guide tubes are all braced relatively to each other thus insuring the proper alinement of the plunger tubes and the plungers operating therein and likewise the plungers themselves are tied together in pairs so that they mutually assist and brace each other.

What I claim is:—

1. A fender for marine vessels comprising a head yoke extending downwardly from the bow of the vessel, supporting means for said yoke, side fender plates extending aft from said yoke, means detachably connecting said yoke with the side fender plates, and spring cushioned plungers extending forwardly from said yoke.

2. A fender for marine vessels comprising a head yoke extending downwardly from the bow of the vessel, supporting means for said yoke, side fender plates extending aft from said yoke, vertically extending rods connecting said side fender plates and yoke, and means for shifting said rods longitudinally to connect and disconnect said side fender plates and yoke.

3. A fender for marine vessels comprising a head yoke extending downwardly from the bow of the vessel, supporting means for said yoke, side fender plates extending aft from said yoke, spring cushioned plungers extending forwardly from said yoke, housing tubes in which said plungers are slidable, and tie-bars connecting adjacently located housing tubes.

4. A fender for marine vessels comprising a head yoke extending downwardly from the bow of the vessel, supporting means for said yoke, side fender plates extending aft from said yoke, spring cushioned plungers extending forwardly from said yoke, guide tubes for said plungers, diagonal braces connecting adjacently located guide tubes, and collars attached to said braces and surrounding said guide tubes.

In testimony whereof I affix my signature in presence of two witnesses.

TONY $\overset{\text{his}}{\times}$ ORLANDO.
mark

Witnesses:
　　VICTOR SCHWARZ,
　　MOSES BERNSTEIN.

---

Copies of this patent may be obtained for five cents each, by addressing the " Commissioner of Patents. Washington, D. C."